7078X
T. GREGG.
Refining Iron.
Patented May 22, 1832.
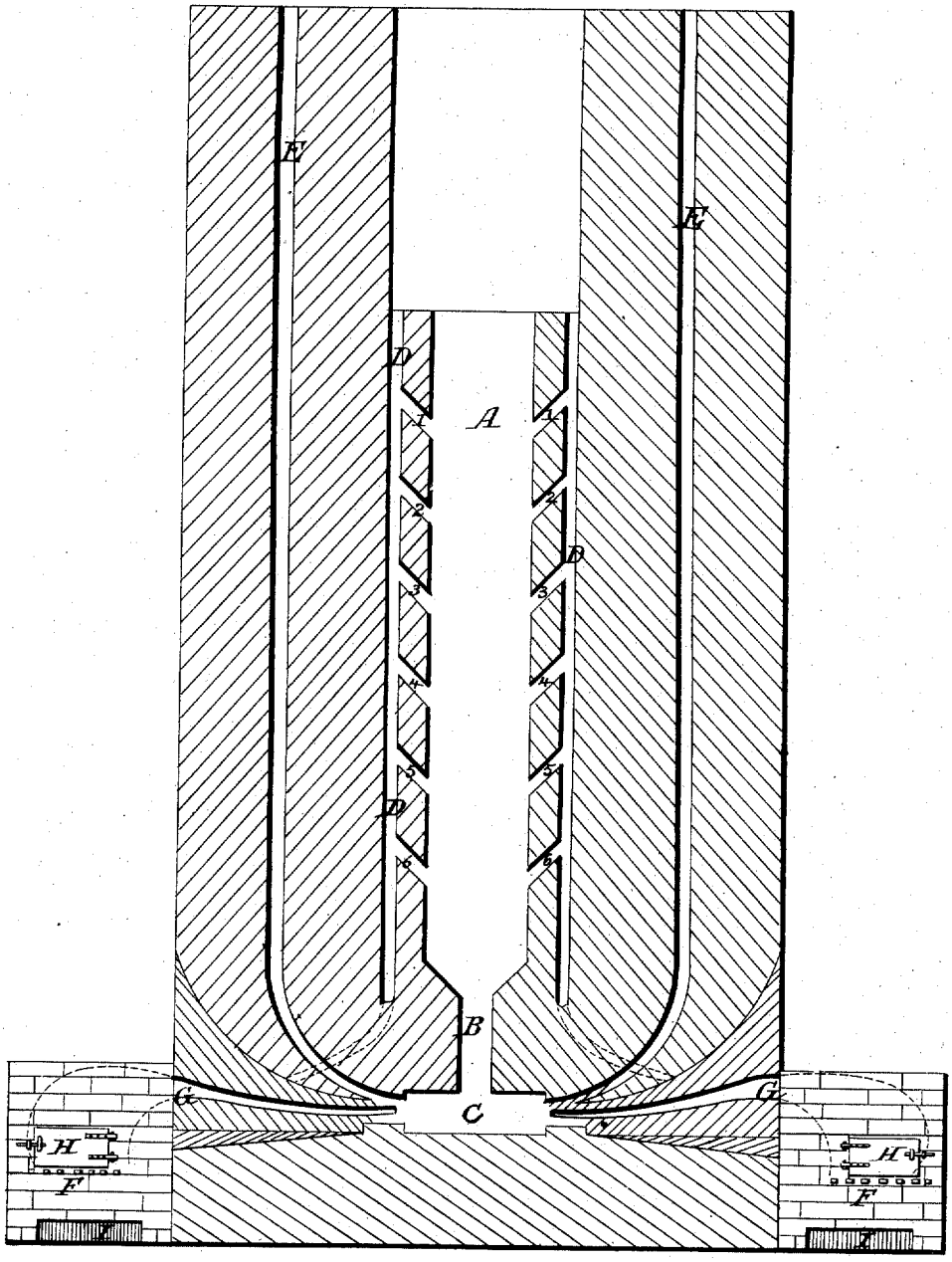
N. PETERS, Photo-Lithographer, Washington, D. C.

7078X May 22. 1832 [illegible]

Thomas Gregg, of Fayette County, Pennsylvania

Letters Patent.

The Schedule referred to in these Letters Patent and making part of the same, containing a description in the words of the said Thomas Gregg himself of his improvement in the construction of a Blast furnace for smelting Iron ore Be it known that I Thomas Gregg, of Connellsville Township in the County of Fayette, & State of Pennsylvania, have invented a new and useful improvement in the erection of a smelting Blast Furnace particularly adapted for the manufacture of pig & bar iron, and that the following is a full & exact description of the construction & operation of the said furnace as invented by me.

The superstructure or main building of said furnace to be erected of stone from [illegible] feet square at the base to any dimension required the size to be regulated by the quantity of metal to be made, the height of the same to be [illegible] feet or upwards, the interior of the furnace to be lined with fire stone, or fire brick, the cavity for the reception of the minerals to be of a circular form, three feet in diameter at what is denominated the boshes widening gradually as it ascends to three & a half feet at the top or tunnel head. – Within the body of the said superstructure will be two air flues twelve inches wide at the base widening upwards to fourteen inches, the object of said flues is to create a draught for two small furnaces to be erected on one side of the main superstructure which will be denominated generating furnaces. ---- The object of which said generating furnaces is to create a flame which is to be brought in contact with the blast at the tuyere & thence by the aid of said blast to be conveyed into the cavity of the furnace. The introduction of the flame into the furnace as above described is intended to operate as a preventive to the collection of all offensive cinder that collects at times of furnaces worked in the usual way, & will operate as a powerful auxiliary in the decomposition of the minerals, and facilitate

[illegible]

7078X facilitate the operation of smelting & separating the cinder from the
iron. These spiral flues will be carried up in the inner walls from the
head of the [illegible], and for each spiral flue there will be several lateral
flues passing into the interior or cavity of the furnace at an angle of forty
five degrees leading to the ignited fuel. The object of the said flues is the
better to enable all sulphureous and other offensive & pernicious gases
as they become disengaged to make their escape. The draught required
for the generating furnaces will be regulated by what is denominated
dampers placed within the air flues. - The materials used in smelting
will be iron ore, limestone, and charcoal or coke made from bi-
tuminous or anthracite coal. the proportion to be regulated by the
quality of each material. The blast required for said furnace
to be produced by one or more cylinders or blowing tubs, which are
to be propelled by steam or water power.

Recd. [illegible]

Witnesses
Abm. Baldwin
Henry H [illegible]

Thomas Gregg

[542 words